(12) United States Patent  
Phua et al.

(10) Patent No.: US 7,466,878 B2  
(45) Date of Patent: Dec. 16, 2008

(54) INTEGRATED POLARIZATION CONTROLLERS WITH NANO-ELECTROMECHANICAL DIELECTRIC PERTUBATION

(75) Inventors: Poh-Boon Phua, Singapore (SG); Chee Wei Wong, New York, NY (US); Erich P. Ippen, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/351,725

(22) Filed: Feb. 10, 2006

(65) Prior Publication Data

US 2006/0263001 A1    Nov. 23, 2006

Related U.S. Application Data

(60) Provisional application No. 60/652,462, filed on Feb. 11, 2005.

(51) Int. Cl.
  *G02B 6/00* (2006.01)
(52) U.S. Cl. ............... 385/11; 385/6; 385/8; 359/251; 359/281; 359/283; 359/301; 359/302; 359/303; 359/304; 359/352; 359/483
(58) Field of Classification Search ............... None
  See application file for complete search history.

(56) References Cited

U.S. PATENT DOCUMENTS

| 4,384,760 | A | * | 5/1983 | Alferness | 385/11 |
|---|---|---|---|---|---|
| 4,898,441 | A | * | 2/1990 | Shimizu | 385/11 |
| 4,966,431 | A | * | 10/1990 | Heismann | 385/11 |
| 5,025,346 | A | * | 6/1991 | Tang et al. | 361/283.1 |
| 6,384,956 | B1 | * | 5/2002 | Shieh | 359/256 |
| 6,493,474 | B1 | * | 12/2002 | Yao | 385/11 |
| 6,594,408 | B1 | * | 7/2003 | Noe | 385/11 |
| 6,661,936 | B2 | * | 12/2003 | Noe | 385/11 |
| 2005/0185884 | A1 | * | 8/2005 | Haus et al. | 385/16 |

FOREIGN PATENT DOCUMENTS

WO    WO 02/075401 A2    9/2002

OTHER PUBLICATIONS

F. Heismann, M. D. Divino, L. L. Buhl, "Integrated-optic polarization controller with unlimited transformation range",Aug. 1990, American Institute of Physics, Applied Physics and Letters, 57 (9), Aug. 27, 1990, pp. 855-857.*

Lih Y. Lin, Evan L. Goldstein, "Opportunities and Challenges for MEMS in Lightwave Communications", 2002, IEEE Journal on Selected Topics in Quantum Electronics. vol. 8, No. 1, Jan./Feb. 2002, pp. 163-172.*

(Continued)

*Primary Examiner*—Sung Pak  
*Assistant Examiner*—Chad H Smith  
(74) *Attorney, Agent, or Firm*—Gauthier & Connors LLP

(57) ABSTRACT

A polarization controller includes a phase retarder having a rotation about an {1,0,0} axis that receives an optical signal from a waveguide structure. At least one nanoelectromechanical dielectric perturber produces ±45° birefringent axes by placing the at least one nanoelectromechanical dielectric perturber at selective positions around the phase retarder to produce dynamic change in the effective index in one of the modes existent in an extraordinary axial direction.

6 Claims, 10 Drawing Sheets

OTHER PUBLICATIONS

Heismann et al., "Integrated—optic polarization controller with unlimited transformation range" 1990 American Institute of Physics, Appl. Phys. Lett. 57 (9) 27, Aug. 1990. pp. 855-857.

Lin et al., "Opportunities and Challenges for MEMS in Lightwave Communications" Journal on Selected Topics in Quantum Electronics, vol. 8, No. 1, Jan./Feb. 2002, pp. 163-172.

* cited by examiner mode 1 y, ordinary direction x, extraordinary direction $n_{e, eff} = 1.4303$ mode 2

$n_{o, eff} = 1.4279$

INTEGRATED POLARIZATION CONTROLLERS WITH NANO-ELECTROMECHANICAL DIELECTRIC PERTUBATION

PRIORITY INFORMATION

This application claims priority from provisional application Ser. No. 60/652,462 filed Feb. 11, 2005, which is incorporated herein by reference in its entirety.

BACKGROUND OF THE INVENTION

The invention relates to the field of nanoelectromechanical structures (NEMS), and in particular to nanoelectromechanical dielectric perturbation on degenerate modes of integrated waveguides to access all polarization states reconfigurably, while permitting high-density optical integration.

With the current drive towards silicon microphotonics monolithically integrated with advance electronics, signal polarization states in transmission fibers are stochastic, leading to significant pulse distortion and system impairments at high transmission rates (above 10 Gb/s for example) or long fiber spans (10,000 km for example). The temporal random-walk process of the polarization states is estimated on order of milliseconds, arising from loss of circular symmetry due to external stress or temperature fluctuations on the fibers. Moreover, PMD varies with signal frequencies and thus mitigation must be performed channel-by-channel. This thus defines the need for a low cost, scalable compensator at few kHz.

SUMMARY OF THE INVENTION

According to one aspect of the invention, there is provided a polarization controller. The polarization controller includes a phase retarder having a rotation about an $\{1,0,0\}$ axis that receives an optical signal from a waveguide structure. At least one nanoelectromechanical dielectric perturber produces ±45° birefringent axes by placing the at least one nanoelectromechanical dielectric perturber at selective positions around the phase retarder to produce dynamic change in the effective index in one of the modes existent in an extraordinary axial direction.

According to another aspect of the invention, there is provided a method of controlling states of a polarization controller. The method includes providing a rotation about an $\{1,0,0\}$ axis for an optical signal received from a waveguide structure. Also, the method includes producing ±45° birefringent axes by placing the at least one nanoelectromechanical dielectric perturber at selective positions to produce dynamic change in the effective index in one of the modes existent in an extraordinary axial direction.

DETAILED DESCRIPTION OF THE INVENTION

Polarization controllers with free-space micromirrors are well known. The present invention advances the developments in polarization controllers in the following three ways. Firstly, the perturbation of the inventive device is performed by dielectric proximity switching, instead of conventional electro-optic effects, permitting large perturbations at significantly lower switching powers. Secondly, the development of high-density integrated reconfigurable polarization controllers can now provide a critical solution for polarization mode dispersion compensation in high bit-rate multi-channel optical networks. Thirdly, the achievement of all-state polarization controllers in a planar single-level CMOS-compatible platform suggests new electronics-photonics architecture for optical signal processing.

Figure 1A:
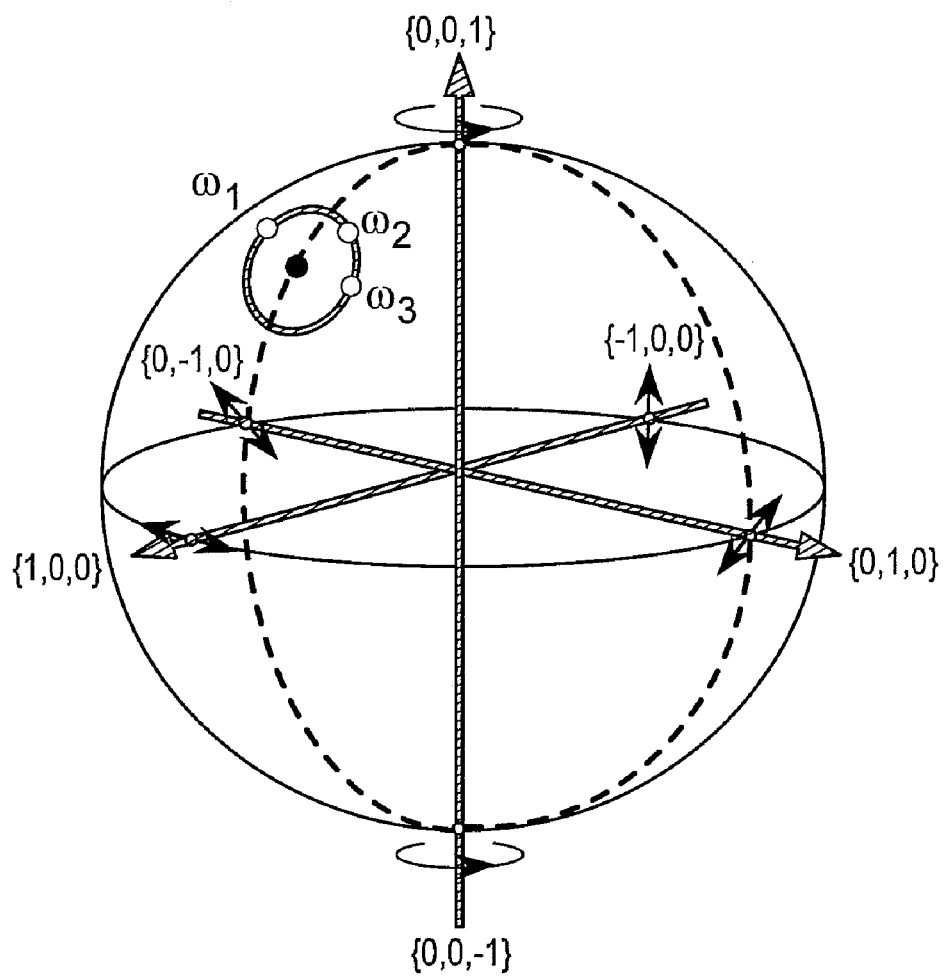
FIG. 1A is a schematic diagram illustrating a state of polarization represented in a Poincaré sphere.

One can define the state of polarization (SOP) as the time variation of the tip of the E-field vector at a fixed point in space. This is represented as $E(t)=\hat{h}e_h \cos(\omega t-\psi_h)+\hat{v}e_v \cos(\omega t-\psi_v)$, where $\hat{h}$ and $\hat{v}$ are mutually orthogonal to the propagation direction. Through the Stokes parameters, the SOPs are conveniently depicted in the Poincaré sphere as shown in FIG. 1A, where any monochromatic SOP (completely polarized, with $e_h$ and $e_v$ not a function of t) lies on the Poincaré-sphere surface.

Figure 1B:
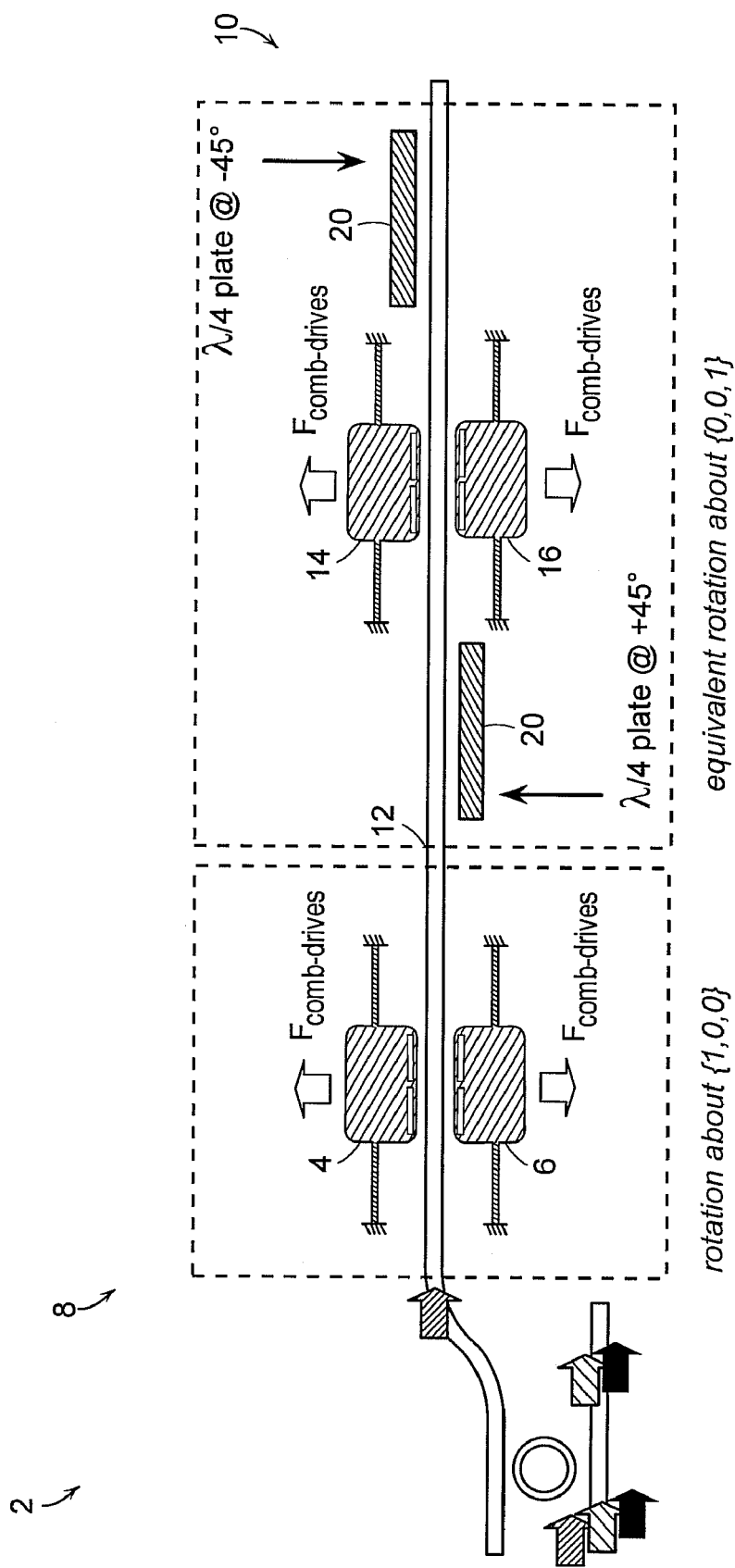
FIG. 1B a design concept of the all-state polarization controller with NEMS dielectric perturbation.

FIG. 1B shows an all-state polarization controller 2 in accordance with the invention. To transform all arbitrary SOPs to a final state which is a linearly polarized state rotations about only any two orthogonal axis are needed. That is, only a birefringent phase retarder 8 with rotation about $\{1,0,0\}$ is cascaded with a rotator 10, with a rotation about $\{0,0,1\}$ axis, is needed, as shown in FIG. 1B. A waveguide 12 receives an optical signal that passes through the phase retarder 8 and rotator 10, The phase retarder 8 includes two comb drives 4, 6, and the rotator 10 includes two comb drives 14, 16. Moreover, the rotator 10 includes two quarter wavelength plate 20. In fact, the equivalent of a rotator 10 about the $\{0,0,1\}$ can be achieved by capping a birefringent phase retarder 8 with two quarter-wavelength plates at tilted ±45° birefringent axes.

The Jones matrix representation (alternative representations are in Stokes space or energy space) of a quarter-wave plate tilted at +45° birefringence, a birefringent retarder with Γ phase delay, and a second quarter-wave plate tilted at −45° birefringence cascaded together is represented as $$R_{equivalent} = R_{2ndQW} \cdot R_{retarder} \cdot R_{1stQW} = \begin{pmatrix} 0 & 0 & -1 \\ 0 & 1 & 0 \\ 1 & 0 & 0 \end{pmatrix} \cdot \begin{pmatrix} 1 & 0 & 0 \\ 0 & \cos\theta & -\sin\theta \\ 0 & \sin\theta & \cos\theta \end{pmatrix} \cdot \begin{pmatrix} 0 & 0 & 1 \\ 0 & 1 & 0 \\ -1 & 0 & 0 \end{pmatrix} = \begin{pmatrix} \cos\theta & -\sin\theta & 0 \\ \sin\theta & \cos\theta & 0 \\ 0 & 0 & 1 \end{pmatrix} \quad \text{Eq. 1}$$

The last equality shows the equivalent of the cascaded elements into a rotator with rotation about $\{0,0,1\}$.

Figure 2A:
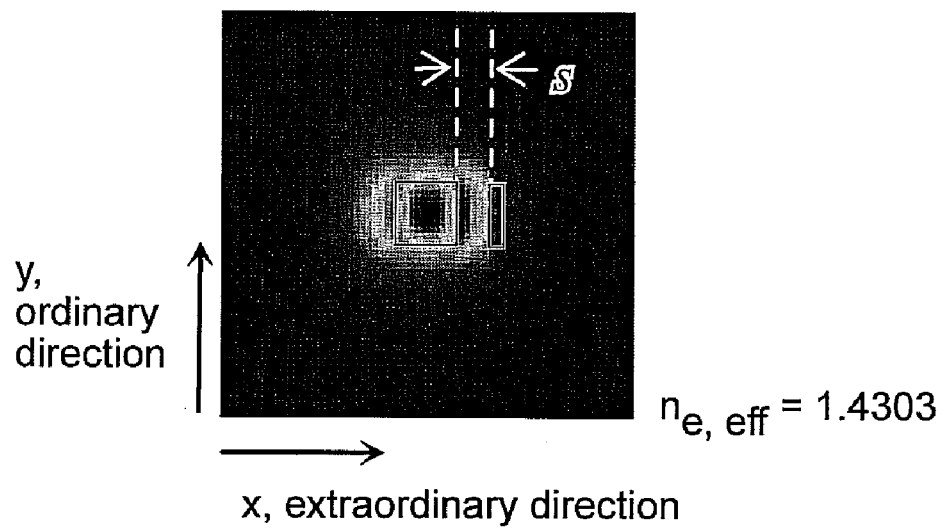
FIG. 2A is an electric field mode profile for a specific nanoelectromechanical (NEMS) dielectric separation.
Figure 2A:
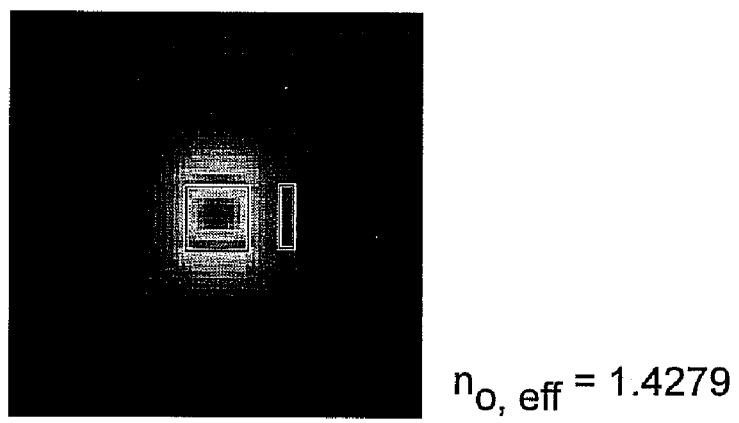
Figure 2B:
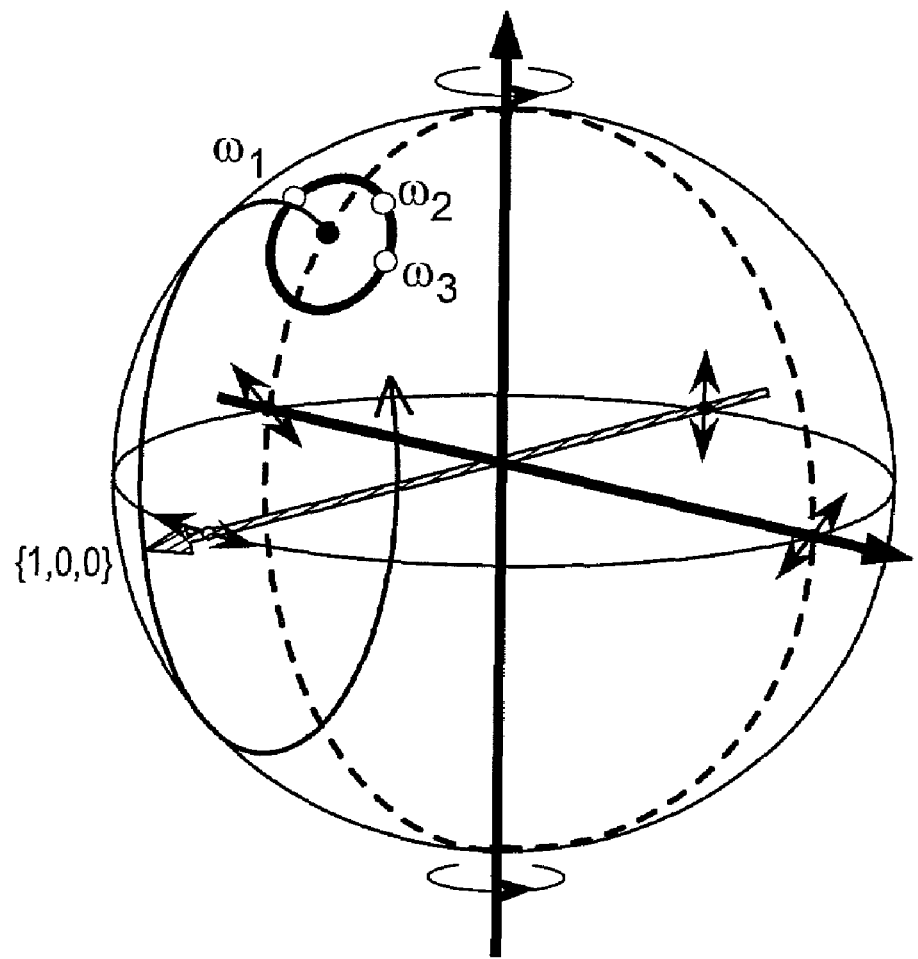
FIG. 2B is a schematic diagram illustrating an equivalent state of polarization rotation about the $\{1,0,0\}$ axis for variable effective indices.

A symmetric waveguide has two doubly-generated modes. One can induce local birefringence in the waveguide by breaking the symmetry of the effective index in one of the two orthogonal modes (such as the horizontal direction). This is shown in the FIG. 2A, which illustrates the mode profiles aligned along the extraordinary and the ordinary directions. By designing a dynamic change in the effective index in one of the modes (such as with the extraordinary direction), the SOP is dynamically rotated about $\{1,0,0\}$ in the Poincaré sphere since the perturbation is from the horizontal direction as shown in FIG. 2B.

Figure 2C:
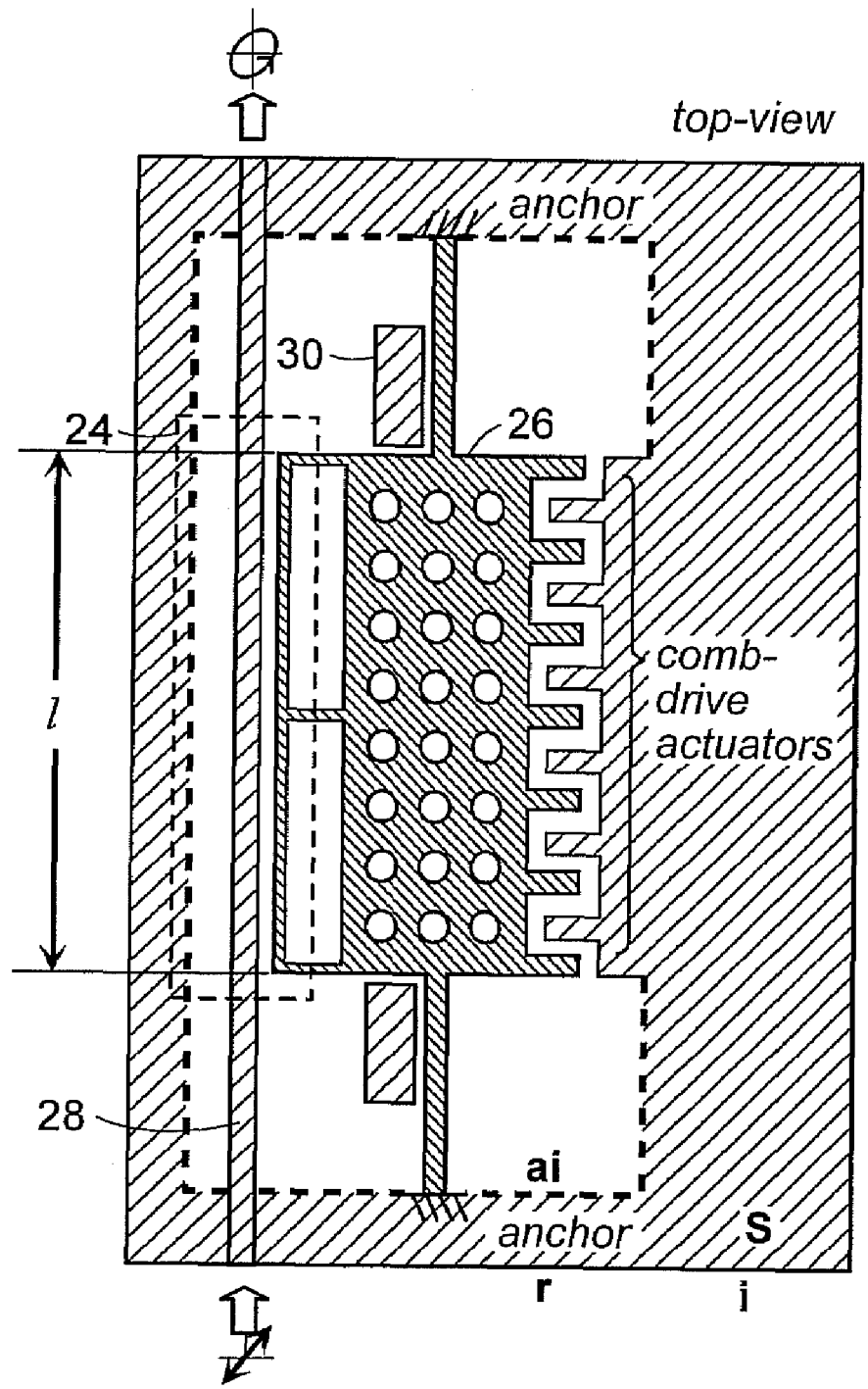
FIG. 2C is a schematic diagram illustrating a single-level planar design of variable nanoelectromechanical (NEMS) dielectric perturbation.

The retardance angle is $(n_e-n_o)k_o z$. So in Stokes space, this can be viewed as a rotation about $\{1,0,0\}$ with a retardation angle $(n_e-n_o)k_o z$, as shown in FIG. 2B The dynamic change in the effective index in an extraordinary direction is made possible by the sliding motion of a nanoelectromechanical (NEMS) dielectric perturber 24. The device layout for the sliding motion is achieved with a suspended structure double-anchored on both sides, with a comb-drive actuation mechanism 26. This is illustrated in FIG. 2C. The suspended structure 24 is designed with a trade-off between: (1) sufficient horizontal stiffness to achieve displacement accuracy on order 10 nm, versus (2) low driving voltages of the comb-drive actuators 26 on order 10-30 V. A stopper 30 is included in the suspended structure design to prevent any physical contact between the waveguide 28 and the NEMS dielectric perturber 24.

The length of the perturbing dielectric 24, l, is designed from a trade-off between: (1) minimizing the device size, versus (2) a small effective index change $(n_e-n_o)$, on order 0.005, to minimize any transmission losses from the discontinuous effective index change. For a length l of 8 μm and s of 250 nm, the polarization dependent loss between TE and TM modes is estimated through 3D finite-difference time-domain computations and found to be ~0.03 dB at 1.55 μm, which is on order of the waveguide scattering losses. Moreover, for a length l of 50 mm and s of 250 nm, the polarization dependent loss (PDL) between TE and TM modes is estimated through 3D finite-difference time-domain computations and found to be ~0.08 dB at 1.55 mm. The PDL is suspected to be larger than this numerical computation due to the differential roughness of the waveguides actually fabricated; hence close attention will be paid to the waveguide sidewall roughness.

A tremendous advantage of this proposed tunable birefringent phase retarder is the achievement of dielectric NEMS perturbation in a single-level planar design with low actuation voltages and large tuning effects. The entire configuration is implemented in a CMOS-compatible fabrication scheme, supporting the drive towards silicon microphotonics.

Figure 3:
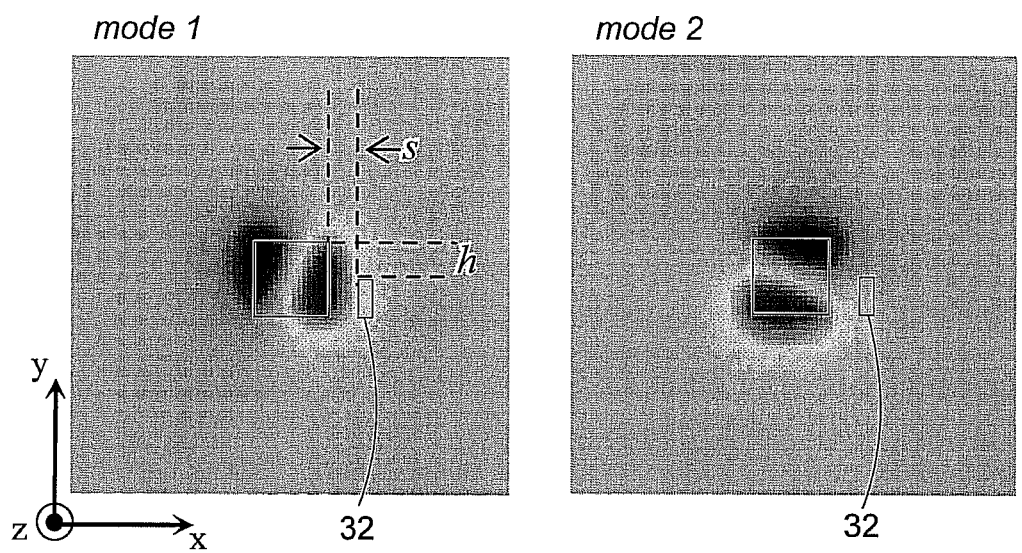
FIG. 3 illustrates mode profiles of planar integrated quarter-wave plates at +θ° birefringent axis.

To permit rotation about the $\{0,0,1\}$ axis, a quarter-wave plate at +45° birefringence is implemented before the birefringent phase retarder, and another quarter-wave plate at −45° birefringence implemented after. This is described earlier in Equation (1). The ±45° birefringent axes are created by placing a perturbing dielectric on top of a symmetric waveguide and a second perturbing dielectric on the side of the waveguide, or the same tilt in the birefringent axes can be created by reducing the height h of the perturbing dielectric 32 with respect to the height of the waveguides. The designed structure is outlined in FIG. 3 for a +θ° birefringent axis. The imaginary component of $E_z$ is illustrated in FIG. 3.

Figure 4A:
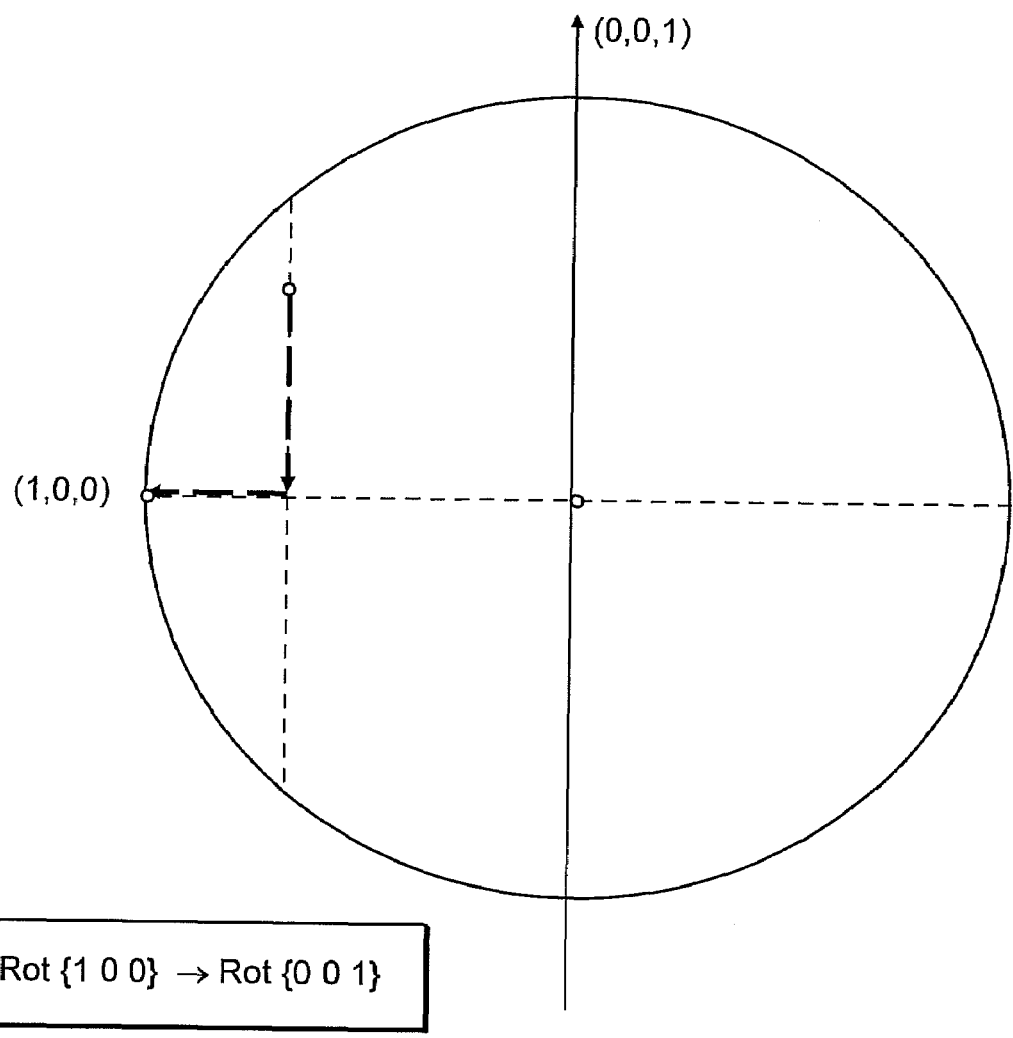
FIGS. 4A-4C are schematic diagrams illustrating various rotations of a state of polarization represented in a Poincaré sphere.
Figure 4B:
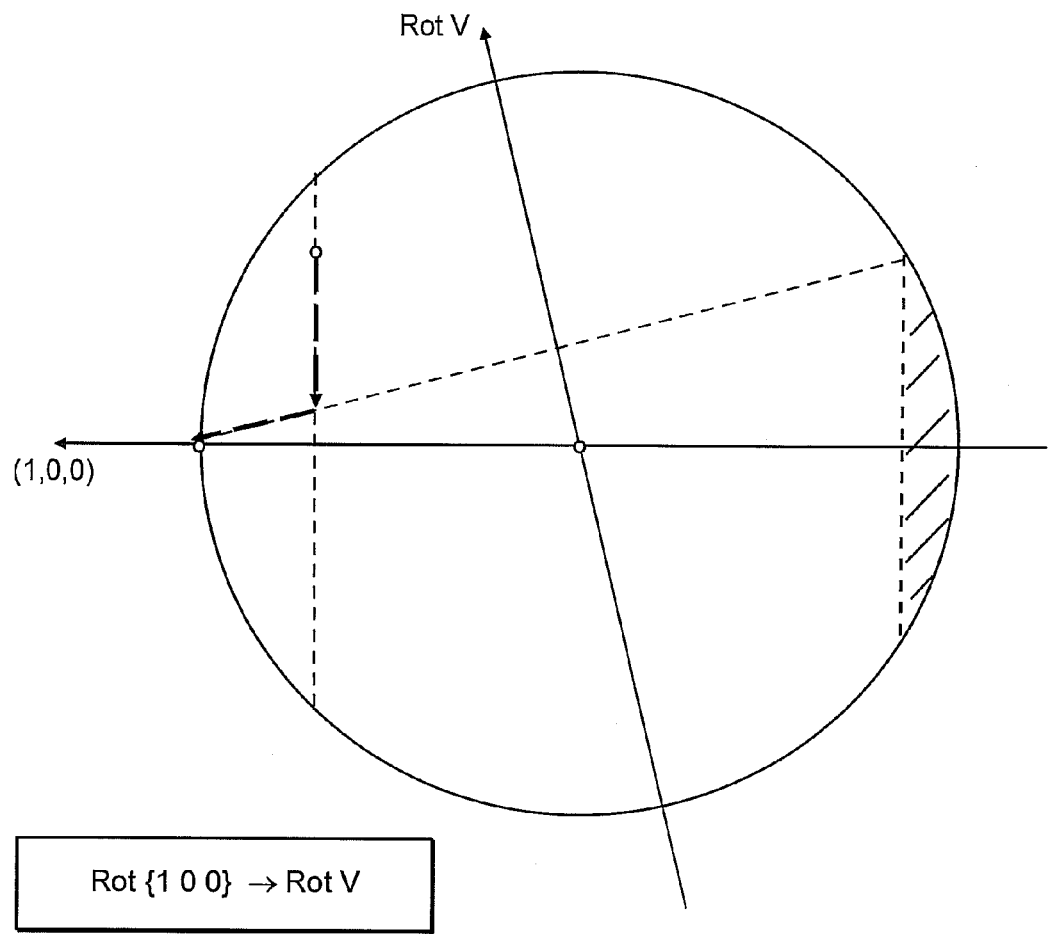
Figure 4C:
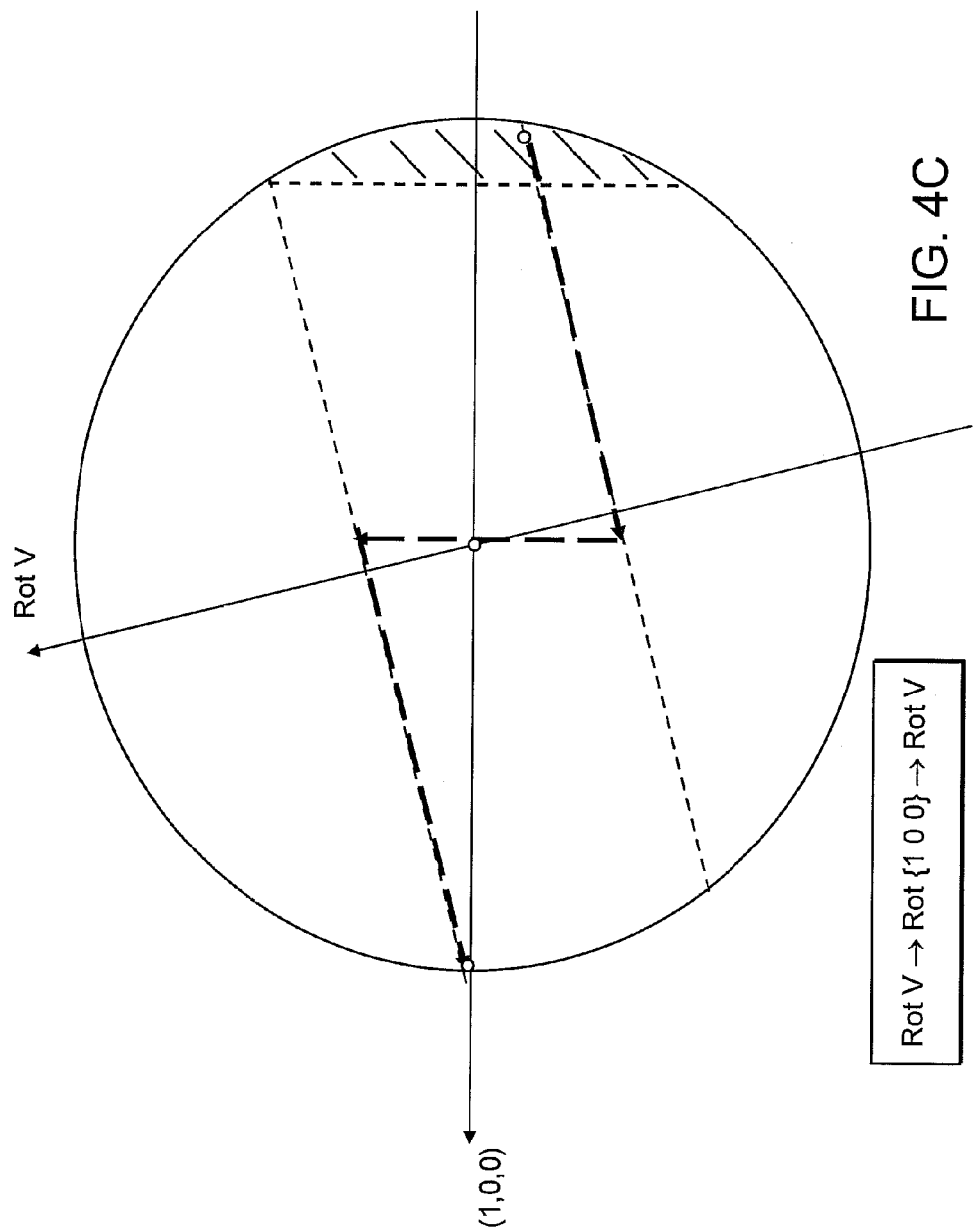

Deviation of the birefringence axis from the ideal ±45° will result in second rotational axis being not orthogonal to the first rotational axis. This leads a region on the Poincaré sphere that is not approachable. FIGS. 4A-4C illustrate this issue. Assume that if one wants our final SOP state to be horizontal polarized light (i.e $\{1,0,0\}$ in Stokes Space), then from FIG. 4A, one can see that for any input SOP, one can map onto $\{1,0,0\}$ if one has a rotation about $\{1,0,0\}$ followed by a rotation about $\{0,0,1\}$. However, when the rotation axis of second transformation deviates from the $\{0,0,1\}$ axis, as in FIG. 4B, thus that input SOP in the shaded region can no longer map onto (1,0,0). This shaded region grows when the deviation increases. To overcome this problem, one can introduce additional rotation: Rot V->Rot$\{1,0,0\}$->Rot V. From FIG. 4C, one can see that the input SOPs within the shaded region can be mapped onto $\{1,0,0\}$.

Figure 5A:
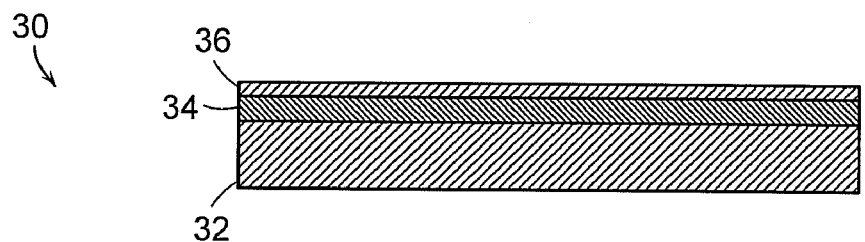
FIGS. 5A-5C are process graphs illustrating the fabrication process of all-state polarization controllers with NEMS dielectric perturbation.
Figure 5B:
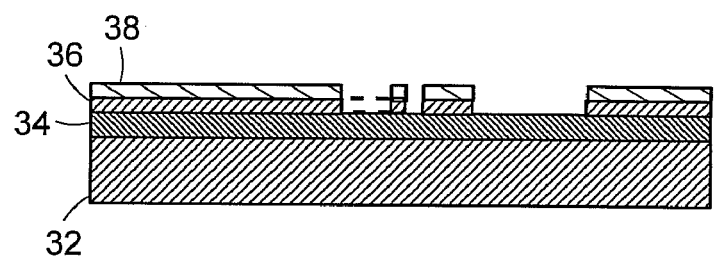
Figure 5C:
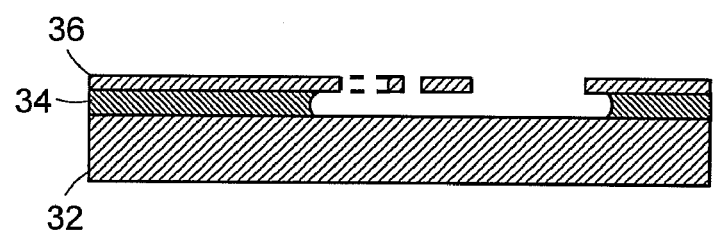

The device is elegantly designed for a single-level implementation (instead of a multi-level process), which simplifies the development towards a high-density integrated CMOS photonics-electronics architecture. FIG. 5A shows a Silicon-On-Insulator (SOI) 30 used in accordance with the invention. The SOI includes a Si substrate 32, a thermal $SiO_2$ layer 34, AND a coated Si layer 36. FIG. 5B illustrates an electron-beam lithography being performed on the SOI 30 to define 100 nm minimum features. A layer 38 of Cr is added prior to the lithography. FIG. 5C demonstrates the lithographed structure being released with a buffered oxide wet etch to remove portions of the thermal $SiO_2$ 34 and Cr layer 36. Given the possible fabrication deviation from the ideal symmetric waveguides, the waveguide fabrication will target towards smaller widths than heights, in order for the guided modes to still experience the induced birefringence from the horizontally-placed perturbing dielectric slab.

Although the present invention has been shown and described with respect to several preferred embodiments thereof, various changes, omissions and additions to the form and detail thereof, may be made therein, without departing from the spirit and scope of the invention.

What is claimed is:

1. A polarization controller comprising:
   a phase retarder having a rotation about an $\{1,0,0\}$ axis, said phase retarder coupled to a waveguide structure receiving an optical signal; and
   at least two nanoelectromechanical dielectric perturbers that produce ±45° birefringent axes by placing said at least two nanoelectromechanical dielectric perturbers at selective positions around said waveguide structure to produce dynamic change in the effective index in one of the modes existent in an extraordinary axial direction by the sliding motion of said at least two nanoelectromechanical dielectric perturbers using a suspended structure double-anchored on both sides of said waveguide with at least one comb-drive actuation mechanism.

2. The polarization controller of claim 1, wherein said one of said at least two nanoelectromechanical dielectric perturbers are placed before the phase retarder, and another implemented after said phase retarder.

3. The polarization controller of claim 2, wherein said at least two nanoelectromechanical dielectric perturbers comprise two quarter-wavelength plates.

4. A method of controlling states of a polarization controller comprising:
   providing a rotation about an $\{1,0,0\}$ axis for an optical signal received from a waveguide structure; and
   producing ±45° birefringent axes by placing at least two nanoelectromechanical dielectric perturbers at selective positions around said waveguide structure to produce dynamic change in the effective index in one of the modes existent in an extraordinary axial direction by the sliding motion of said at least two nanoelectromechanical dielectric perturbers using a suspended structure double-anchored on both sides of said waveguide with at least one comb-drive actuation mechanism.

5. The method of claim 4, wherein said one of said at least two nanoelectromechanical dielectric perturbers are placed before the phase retarder, and another implemented after said phase retarder.

6. The method of claim 5, wherein said at least two nanoelectromechanical dielectric perturber comprise two quarter-wavelength plates.

* * * * *